J. KENNEDY.
SHAFT COUPLING.
APPLICATION FILED OCT. 14, 1914.
1,145,489.
Patented July 6, 1915.
2 SHEETS—SHEET 2.
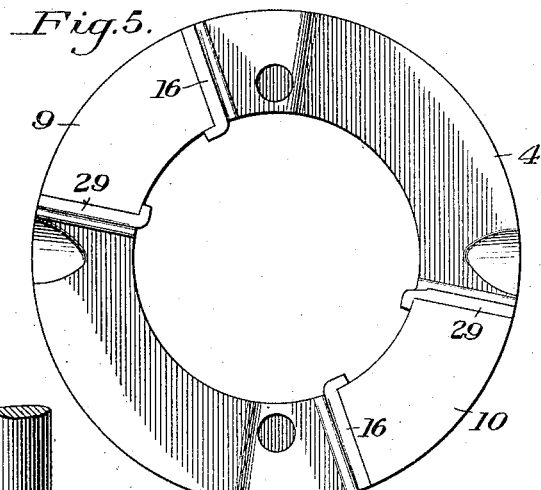
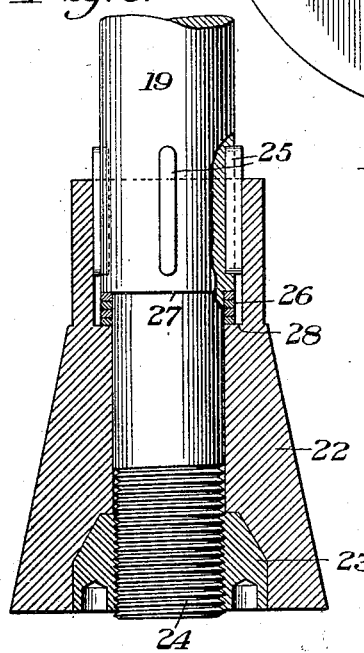
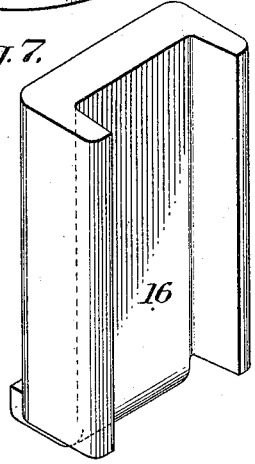
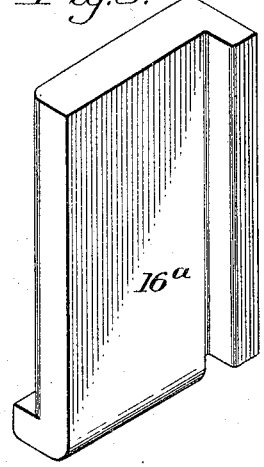
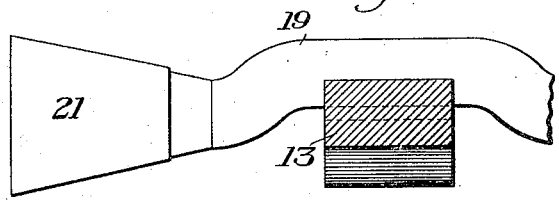
WITNESSES
INVENTOR

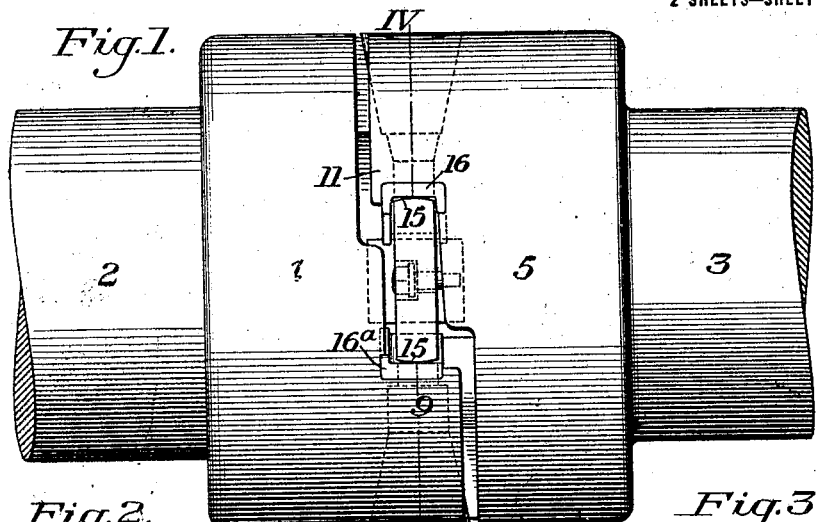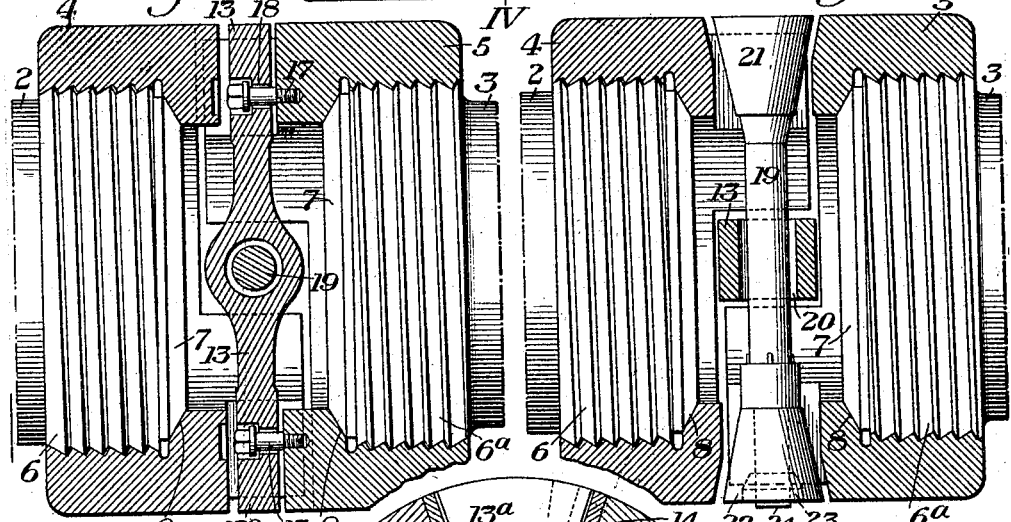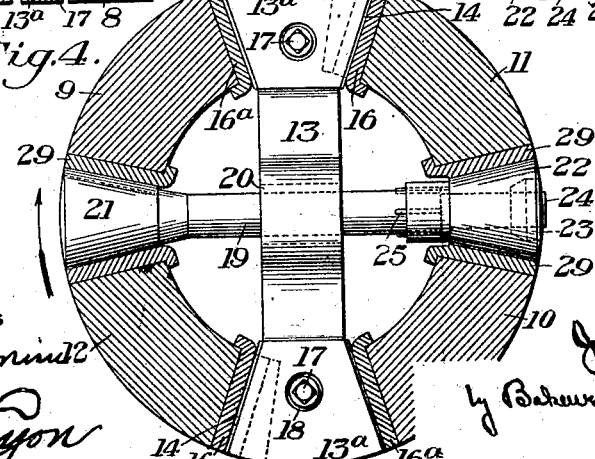

UNITED STATES PATENT OFFICE.

JULIAN KENNEDY, OF PITTSBURGH, PENNSYLVANIA.

SHAFT-COUPLING.

1,145,489.  Specification of Letters Patent.  Patented July 6, 1915.

Application filed October 14, 1914. Serial No. 866,620.

*To all whom it may concern:*

Be it known that I, JULIAN KENNEDY, a citizen of the United States, residing at Pittsburgh, in the county of Allegheny and State of Pennsylvania, have invented a new and useful Improvement in Shaft-Couplings, of which the following is a full, clear, and exact description, reference being had to the accompanying drawings, forming part of this specification, in which—

Figure 1 is a side elevation of a shaft coupling embodying my invention. Figs. 2 and 3 are longitudinal sectional views taken in planes at substantially right angles to each other. Fig. 4 is a section on the line IV—IV of Fig. 1. Fig. 5 is a face view of one of the coupling members. Fig. 6 is a detail sectional view. Figs. 7 and 8 are detail perspective views, and Fig. 9 is a detail view showing a modification.

My invention has relation to shaft couplings; and is designed to provide a coupling capable of transmitting heavy loads, and which will provide for sufficient flexibility to permit of considerable variation in the alinement of the coupled shaft members.

The nature of my invention will be best understood by the accompanying drawings, in which I have shown a preferred embodiment thereof, and which will now be described, it being premised, however, that various changes can be made in the details of construction and arrangement of the parts within the scope of the appended claims, without departing from my invention.

In these drawings, the numerals 2 and 3 designate two shaft members which are united by a coupling embodying my invention.

Each shaft member is provided at its coupled end with a coupling member 4 or 5. While these coupling members may be formed integral with the shaft, or may be separately formed and secured thereto in any desired way, I prefer to form the adjacents ends of the two shaft members with the oppositely threaded portions 6 and 6ª, and to construct the coupling members in the form of sleeves adapted to be screwed upon such threaded portions. Preferably each threaded portion terminates in the coned surface 7 which, when the coupling member is screwed thereon, fits the correspondingly coned surface 8 of such member. This construction provides for a secure attachment of the coupling members to the shaft ends and one in which there is a constant tightening tendency in use.

Each coupling member is formed on its coupling face with two segmental lugs or projections. The lugs or projections on the member 4 are designated by the numerals 9 and 10, while the projections on the coupling member 5 are designated by the numerals 11 and 12. The two coupling members are so placed that these four segmental projections will be in alternating relation, as shown in Fig. 4, being separated from each other by equidistant intervening spaces.

13 designates a main drive member which is in the form of a bar extending diametrically between the two coupling members and having at its ends the head portions 13ª which are adapted to fit in two of the opposite spaces between the adjacent projections of the coupling members. The head portions 13ª have edge surfaces 14 which are generally radial, but which are transversely convexly curved, as indicated at 15, and are preferably conical.

By reference to Figs. 1 and 4, it will be seen that assuming the shaft member 2 to be the driving member and to be turning in the direction indicated by the arrows, the leading edge of the projection 9 will have a driving engagement with one of the convex edges of one of the heads 13ª; while the opposite edge of the other head 13ª will have a driving engagement with the adjacent edge of the projection 12 of the other coupling member. Owing to the fact that the surfaces 15 are convexed transversely, and are also radial in their relation to the axial center of the couplings, said surfaces have a free rolling movement in action and are therefore free from binding, notwithstanding a very considerable wabbling movement of the shaft members. Preferably the bearing surfaces of the projections are formed by the renewable wear-plates or liners 16.

In order to hold the main driving member 13 in position, it may be loosely secured to one of the coupling members by means of the cap bolts 17, these cap bolts extending through enlarged openings 18 in the driving member. Sufficient play is provided at these openings to prevent any binding of the driving member, it being understood that the cap bolts 17 are not intended to carry any of the driving strains, these being taken directly at the abutting surfaces of the driving member and coupling members.

19 designates the auxiliary driving member extending at right angles to the main driving member 12. This auxiliary driving member may either pass through an opening 20 in the main driving member, as shown in Figs. 2 and 3, or the two members may cross each other, as indicated in Fig. 9.

The member 19 has end heads 21 and 22 of conical form which are adapted to fit in the two remaining spaces between the projections on the coupling members, as clearly shown in Fig. 4. Preferably the head 22 at one end is made adjustable, as shown in Fig. 6, so as to take up any wear of the parts. This adjustment is shown as being obtained by means of the nut 23 fitting a recess in the outer end of the head 22 and screwed upon the threaded end portion 24 of the auxiliary driving member. The head 22 is itself secured to said driving member by means of keys 25. Washers 26 may be interposed between the shoulder 27 and the seat 28 in said head. The conical form of the end heads 21 and 22, with their taper substantially radial with respect to the axial center of the coupling, gives these heads a rolling bearing on the coupling members.

The coupling is especially designed for use with shafts which are in general constantly driven in one direction, the member 13 forming the main drive connection and the member 19 an auxiliary drive connection. The member 19 is, however, more especially provided for the purpose of enabling the rotation of the shaft to be effected in the reverse direction when necessary.

It will be readily understood that the members 13 and 19 form a connection between the two coupling members which will be practically rigid so far as the transmission of power from one shaft member to the other is concerned; but which at the same time permits of a very considerable variation in the alinement of the two shaft members. That is to say, either or both shaft members may be moved considerably out of alinement and this movement will be taken care of at the convex bearing edges of the heads 13ª.

By reference to Figs. 1, 2 and 3, it will be seen that there is considerable clearance in a longitudinal direction between the heads of the main and auxiliary drive members and the adjacent surfaces of the coupling members. This clearance permits of quite an angular variation between the longitudinal axes of the two shafts.

The bearing surfaces for the heads 21 and 22 of the auxiliary driving member may be formed by means of wearing-plates or liners 29, which are similar to the liners 16 and 16ª.

It will be readily understood that the particular construction of the coupling members and also of the main and auxiliary drive members may be varied, without departing from my invention.

What I claim is:

1. A shaft coupling, comprising two end members secured to the ends of the shafts to be coupled, and having intercalated lugs or projections, and two diametrically extending driving members arranged at substantially right angles between the coupling members, and loosely engaging each other at the center of the coupling, whereby their axes substantially intersect and said members are free to assume different angular positions longitudinally of the coupling between the two coupling members, substantially as described.

2. A shaft coupling, comprising two end members secured to the ends of the shafts to be coupled, and having intercalated lugs or projections, and two diametrically extending driving members arranged at substantially right angles between the coupling members, and loosely engaging each other at the center of the coupling, whereby their axes substantially intersect and said members are free to assume different angular positions longitudinally of the coupling between the two coupling members, each driving member having end portions which are rigidly fixed thereto, substantially as described.

3. A shaft coupling, comprising two annular internally threaded end members screwed on the ends of the shafts to be coupled and having separated opposed end faces formed with intercalated lugs or projections, and diametrically extending driving members arranged at substantially right angles to each other and loosely engaging each other at the central portion of the coupling, substantially as described.

In testimony whereof, I have hereunto set my hand.

JULIAN KENNEDY.

Witnesses:
H. W. RANO,
J. W. KENNEDY.